United States Patent [19]

Kenny et al.

[11] Patent Number: 5,460,271
[45] Date of Patent: Oct. 24, 1995

[54] SYSTEM AND METHOD FOR SINGULATING INHOMOGENEOUS MATERIALS

[75] Inventors: Garry R. Kenny, College Grove; Michael A. Skeen, Antioch, both of Tenn.

[73] Assignee: Magnetic Separation Systems, Inc., Nashville, Tenn.

[21] Appl. No.: 375,189

[22] Filed: Jan. 18, 1995

Related U.S. Application Data

[63] Continuation of Ser. No. 138,832, Oct. 19, 1993, abandoned.

[51] Int. Cl.$^6$ ..................................................... B07C 5/00
[52] U.S. Cl. .......................... 209/576; 209/577; 198/453; 198/461.1
[58] Field of Search .................. 198/397, 433, 198/443, 453, 457, 461, 587, 690.2, 698, 699; 209/522–525, 576, 577, 587, 588, 644, 930

[56] References Cited

U.S. PATENT DOCUMENTS

| | | | |
|---|---|---|---|
| 2,843,264 | 7/1958 | Pfister | 209/108 |
| 2,941,652 | 6/1960 | Miller | 198/453 |
| 3,240,311 | 3/1966 | Hofer et al. | 198/443 |
| 3,285,387 | 11/1966 | Ochs | 198/33 |
| 3,326,351 | 6/1967 | Ross et al. | 198/690.2 |
| 3,375,916 | 4/1968 | Greiner | 198/443 X |
| 3,392,815 | 7/1968 | Skeels, Sr. et al. | 198/397 X |
| 3,624,773 | 11/1971 | Krooss | 198/397 |
| 3,628,648 | 12/1971 | McClusky | 198/443 X |
| 3,661,256 | 5/1972 | Hain | 209/74 |
| 3,685,650 | 8/1972 | Walther | 209/74 |
| 3,710,919 | 1/1973 | Maters | 198/453 X |
| 3,722,665 | 3/1973 | Probasco | 198/184 |
| 3,835,985 | 9/1974 | Johnson | 198/397 |
| 3,854,567 | 12/1974 | Poupin et al. | 198/20 |
| 3,889,801 | 6/1975 | Boyer | 198/194 |
| 4,146,467 | 3/1979 | Sauer et al. | 209/643 |
| 4,165,278 | 8/1979 | Jaffey | 209/45 |
| 4,457,420 | 7/1984 | Ducloux | 198/369 |
| 4,560,060 | 12/1985 | Lenhart | 198/803 |
| 4,707,251 | 11/1987 | Jenkins et al. | 209/523 X |
| 4,741,428 | 5/1988 | Taniguchi et al. | 198/397 |
| 4,760,909 | 8/1988 | Dudley et al. | 198/369 |
| 4,929,342 | 5/1990 | Johnston | 209/12 |
| 4,934,510 | 6/1990 | Lutgendorf | 198/461 |
| 4,974,719 | 12/1990 | Chenevard | 198/433 |
| 5,236,077 | 8/1993 | Hoppmann et al. | 193/397 X |

FOREIGN PATENT DOCUMENTS

| | | | |
|---|---|---|---|
| 363729 | 4/1990 | European Pat. Off. | 193/453 |
| 260391 | 9/1988 | Germany | 198/453 |

OTHER PUBLICATIONS

Sparks Belting Co., "Cleated Belting", Feb. 1985.

*Primary Examiner*—David H. Bollinger
*Attorney, Agent, or Firm*—Waddey & Patterson; Edward D. Lanquist, Jr.

[57] ABSTRACT

The present invention discloses a method and apparatus for singulating inhomogeneous materials. The pieces of materials are first deposited onto a cleat conveyor which is set at an incline so that the pieces of material not residing on a cleat will fall backwards. The cleat conveyor deposits the materials onto a cross conveyor which has a cross conveyor path perpendicular to the cleat conveyor path. There is a slight drop and slide between the cleat conveyor and cross conveyor. The cross conveyor then deposits materials onto a diverter system having a diverter conveyor moving material along a path. The path is interrupted by diverters extending at obtuse angles across the path of the materials. The diverter system works the materials into a single file order and performs some spacing. The diverter conveyor then deposits the materials onto an acceleration conveyor having a velocity greater then the diverter conveyor. The acceleration conveyor then transports the materials to a sensor conveyor while expanding the distance between the materials. The sensor conveyor then transports the materials through a sensor. The combination of changes in direction and velocity singulate the material and space the materials apart for sensing and separation.

17 Claims, 5 Drawing Sheets

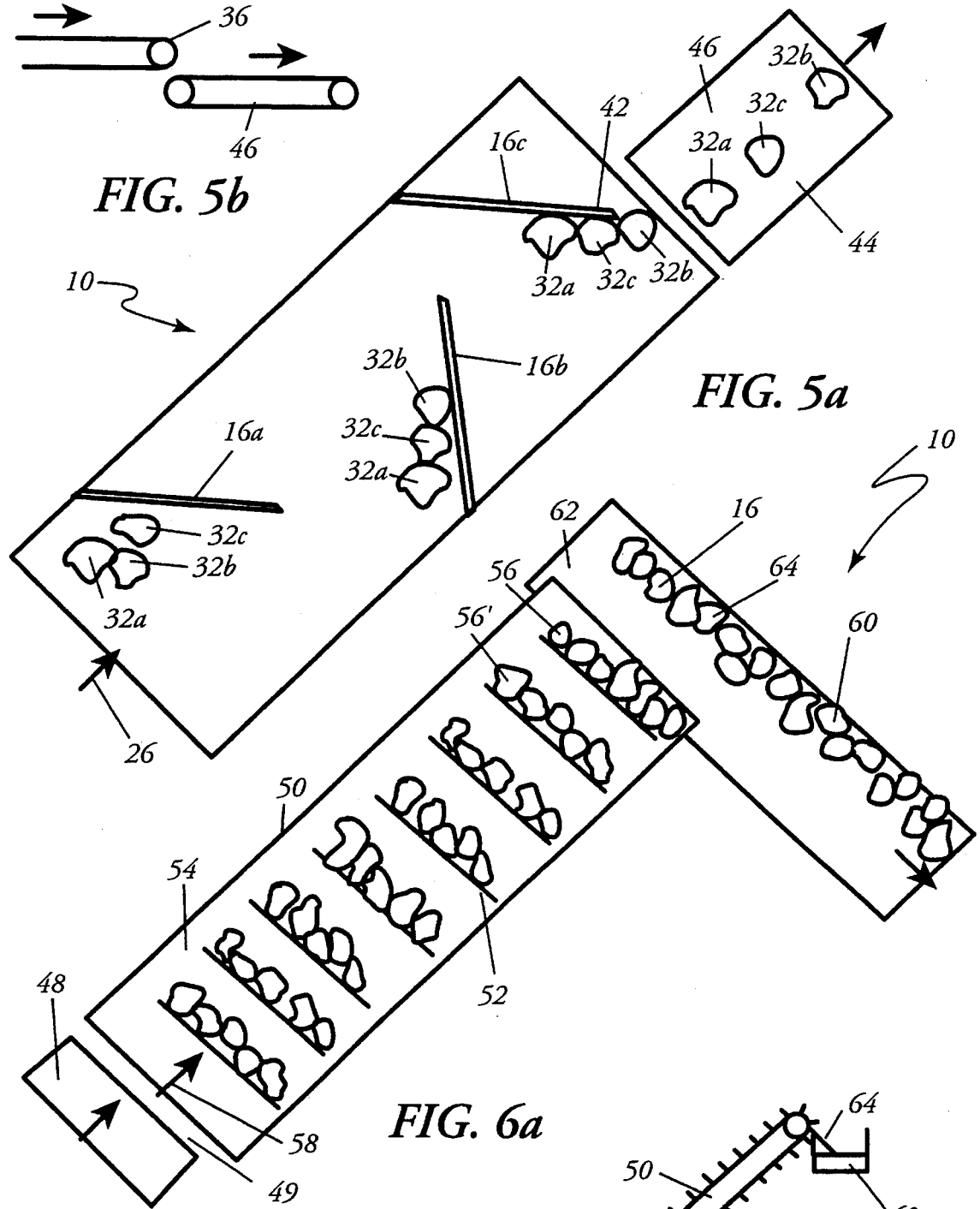

5,460,271

SYSTEM AND METHOD FOR SINGULATING INHOMOGENEOUS MATERIALS

This application is a continuation of application Ser. No. 08/138,832 filed Oct. 19, 1993, now abandoned.

BACKGROUND OF THE INVENTION

The present invention relates generally to a device for singulating recyclable materials and more particularly to a device and method for singulating inhomogeneous materials.

It will be appreciated by those skilled in the art that in order to facilitate recycling of used materials or machining scraps, the materials first need to be separated. The same holds true with certain virgin materials such as ores and the like. The objects are typically inhomogeneous with respect to shape and size. It will further be appreciated by those skilled in the art that separation often requires presentation of the objects to an identification means such as a sensor (one at a time) in order to identify the objects accurately. Identification of multiple objects at the same time is more difficult and, in some cases, currently impossible. Once identified, it is only feasible to separate the objects accurately if they are individually available to an injection system.

What is needed, then, is a system and method for individually ordering inhomogeneous objects. This needed system and method must also be able to separate objects accurately for sensing as well as for separation. This system and method is presently lacking in the prior art.

SUMMARY OF THE INVENTION

The present invention discloses a method and apparatus for singulating inhomogeneous materials. The pieces of materials are first deposited onto a cleat conveyor which is set at an incline so that the pieces of material not residing on a cleat will fall backwards. The cleat conveyor deposits the materials onto a cross conveyor which has a cross conveyor path perpendicular to the cleat conveyor path. There is a slight drop and slide between the cleat conveyor and cross conveyor. The cross conveyor then deposits materials onto a diverter system having a diverter conveyor moving material along a path. The path is interrupted by diverters extending at obtuse angles across the path of the materials. The diverter system works the materials into a single file order and performs some spacing. The diverter conveyor then deposits the materials onto an acceleration conveyor having a velocity greater then the diverter conveyor. The acceleration conveyor then transports the materials to a sensor conveyor while expanding the distance between the materials. The sensor conveyor then transports the materials through a sensor. The combination of changes in direction and velocity singulate the material and space the materials apart for sensing and separation.

Accordingly, one object of the present invention is to provide a system and method for singulating inhomogeneous materials.

Still another object of the present invention is to provide a system and method which transports materials one at a time for identification and separation.

Still another object of the present invention is to singulate inhomogeneous materials in an economic way.

BRIEF DESCRIPTION OF THE DRAWINGS

FIG. 5a is a top view of the diverter system and acceleration conveyor of the present invention.

FIG. 5b is a side view of the diverter system and acceleration conveyor of the present invention.

FIG. 6a is a plan view of the cleat conveyor and cross conveyor of the present invention.

FIG. 6b is a side view of the cleat conveyor and cross conveyor of the present invention.

DESCRIPTION OF THE PREFERRED EMBODIMENT

Figure 1:
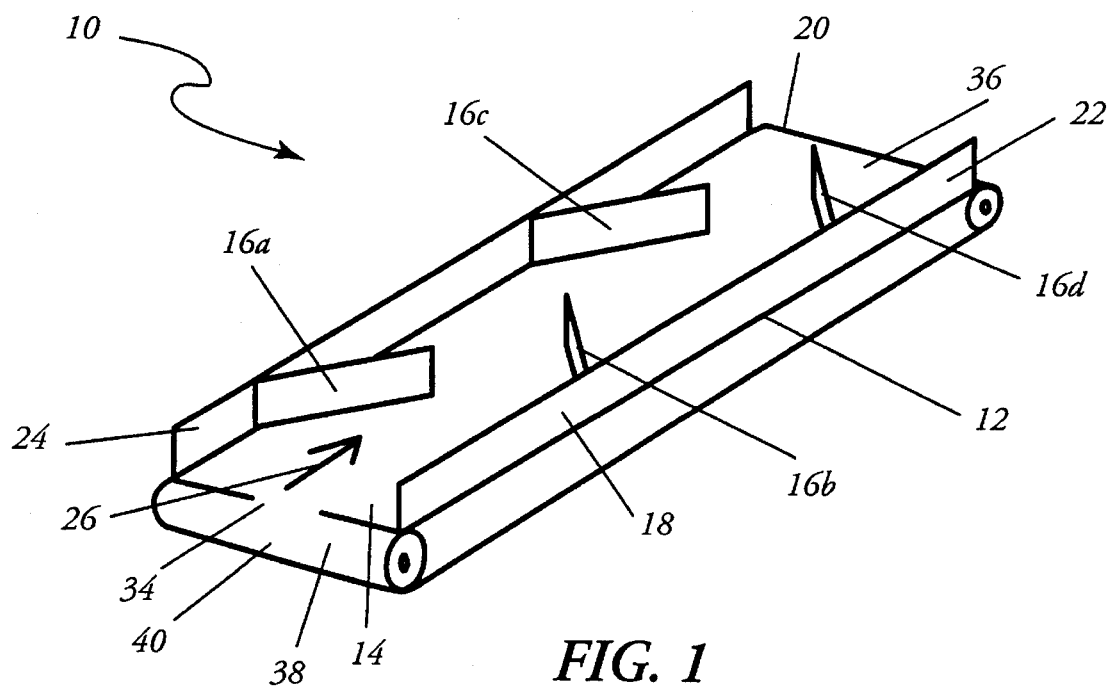
FIG. 1 is a perspective view of the diverter system of the present invention.

Referring now to FIG. 1, there is shown generally at 10 the diverter system of the present invention. Diverter system 10 has conveyor 12 run by conveyor belt 14 which transports materials (32 in FIG. 2) along diverter path 26 in the direction shown. Path 26 has right side 18 and left side 20. Attached to diverter system 10 proximate right side 18 is right wall 22. Attached to diverter system 10 proximate left side 20 is left wall 24. Right wall 22 and left wall 24 are substantially vertical in relation to conveyor 12. Conveyor 12 has receiving end 34 and discharge end 36 such that path 26 travels from receiving end 34 toward discharge end 36. Path 26 has width 38 from right side 18 to left side 20. Middle point 40 lies substantially in between right side 18 and left side 20. Diverters 16 attach to diverter system 18 at either right wall 22 or left wall 24. For example, first diverter 16a attaches to left wall 24 and intersects path 26 at an obtuse angle. Second diverter 16b attaches to right wall 22 and intersects path 26 at an obtuse angle. Third diverter 16c is attached to left wall 24 and intersects path 26 at an obtuse angle. Fourth diverter 16d attaches to right wall 22 and intersects path 26 at an obtuse angle.

Diverters 16 are positioned at an angle to side walls 22, 24, respectively, such that one end of each diverter 16 extends beyond middle point or center line 40 of belt 14. It can be seen that diverters 16 function to force materials (32 in FIG. 2) moving along path 26 along conveyor belt 14 into a serpentine motion as they are transported down length of path 26. Materials (32 in FIG. 2) traveling side by side will tend to be separated parallel to length of conveyor 12 since the speed of material (32 in FIG. 2) which encounters diverter 16 first will decrease parallel to the length of conveyor 12 while the other materials (32 in FIG. 2) will maintain its original speed until it encounters a subsequent diverter 16.

Figure 2:
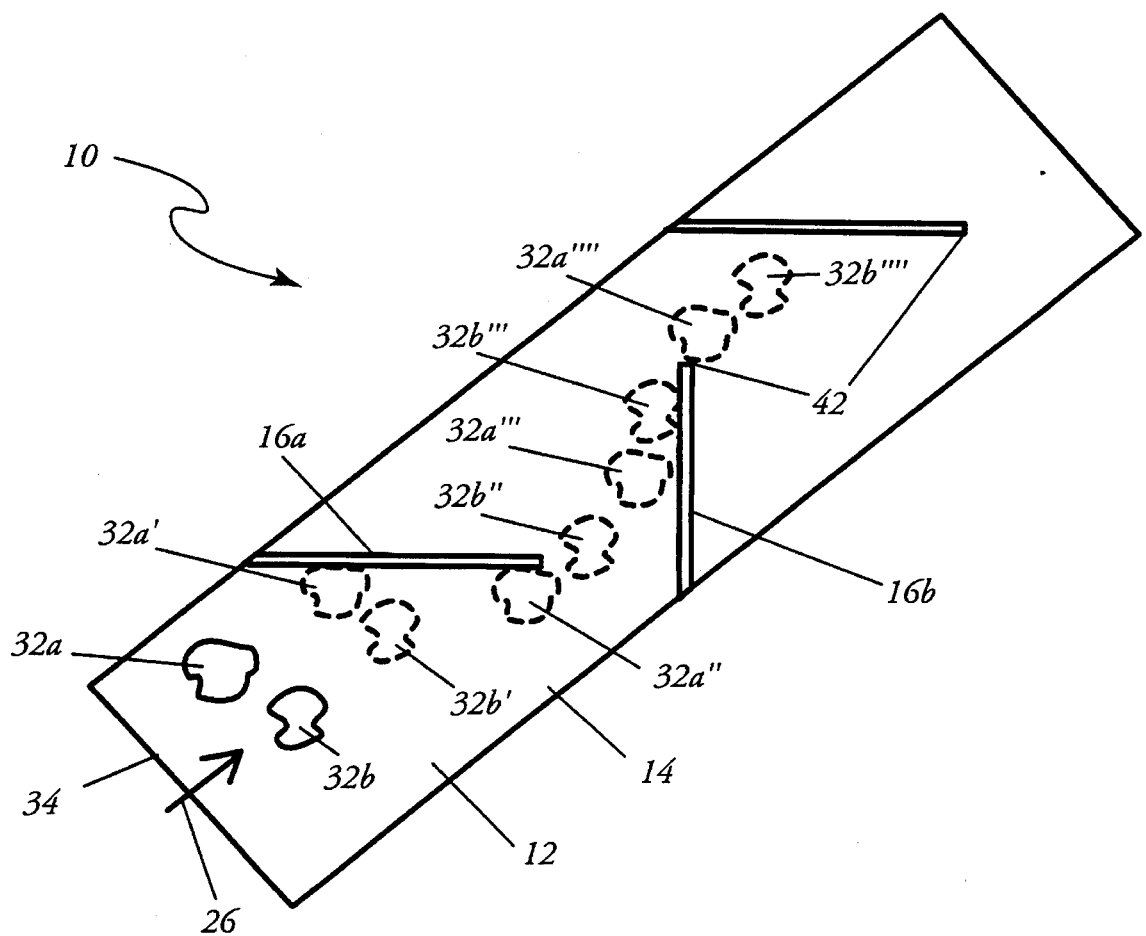
FIG. 2 is a plan view of the diverter system of the present invention.

FIG. 2 shows the operation of diverter system 10 of the present invention. In diverter system 10, materials 32a and 32b are deposited on conveyor 12 and specifically on conveyor belt 14 to travel along path 26. As materials 32a and 32b come into contact with first diverter 16a, first materials will assume position 32a' while second materials will assume position 32b'. As can be seen, first materials 32a' will be slowed by first diverter 16a whereas second materials 32b' will be travel at the rate of velocity of conveyor belt 12. Materials 32a and 32b will then assume the position of 32a" and 32b" as time passes thereby resulting in a single file alignment until they contact second diverter 16b and assume positions 32a'" and 32b'". As time passes further, materials will then become in single file fashion and partially separated to assume position of 32a"" and 32b"". In the preferred embodiment, diverters are placed at an obtuse angle of one hundred thirty-five degrees (135°) with respect to path 26. Therefore, although velocity of conveyor belt 14 is measured at $V_b$, the actual velocity of material caused by deflection caused by diverter 16 is actually $V_d$ which is $V_b$ times the cosine of forty-five degrees (45°). As all cosines are less than one (1), $V_d$ will always be less than or equal to $V_b$. Thus although materials 32 tend to bunch up at each successive diverter, they will separate as they round diverter ends 42.

Figure 3:
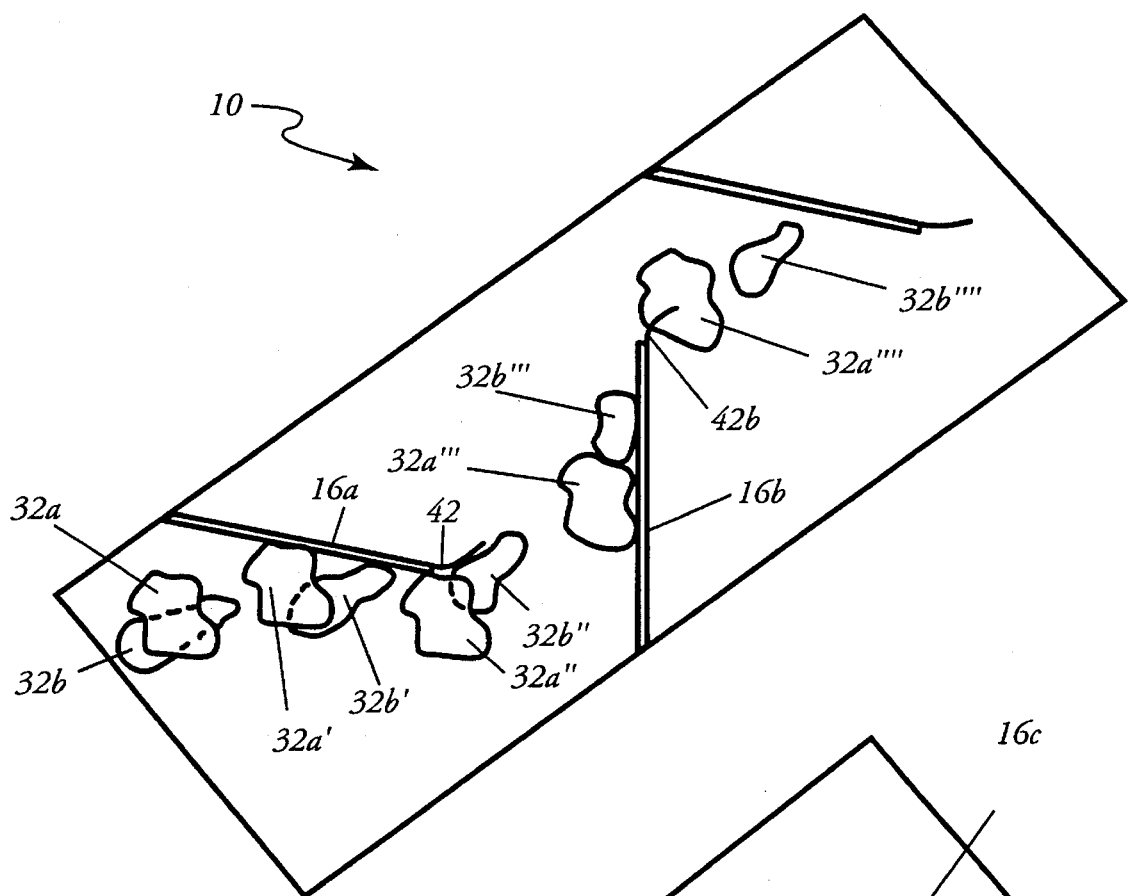
FIG. 3 is a top view of the diverter system of the present invention.

As cluster materials 32 collide with diverter 16, they tend to separate due to the varying size and shape of materials 32. That is, a larger object on top of a smaller object will encounter the diverter sooner and thus be diverted from its original path sooner than the small object thereby causing a differential motion between the two objects. This effect is more clearly shown by referring to diverter system 10 in FIG. 3. In FIG. 3, materials 32a and 32b are deposited onto conveyor belt 14 along path 26 on top of one another. As time passes, materials 32a hits first deflector 16a first thereby assuming position of 32a' while materials 32b assumes position of 32b'. As materials 32 round diverter end 42, materials 32b surges ahead to position 32b" whereas materials 32a is still engaged by first diverter 16a thereby assuming position 32a". Materials 32 will hit second diverter 16b thereby allowing separation as shown in 32a'" and 32b'". As materials 32 pass beyond diverter end 42b, materials separate to positions 32a"" and 32b"".

Figure 4:
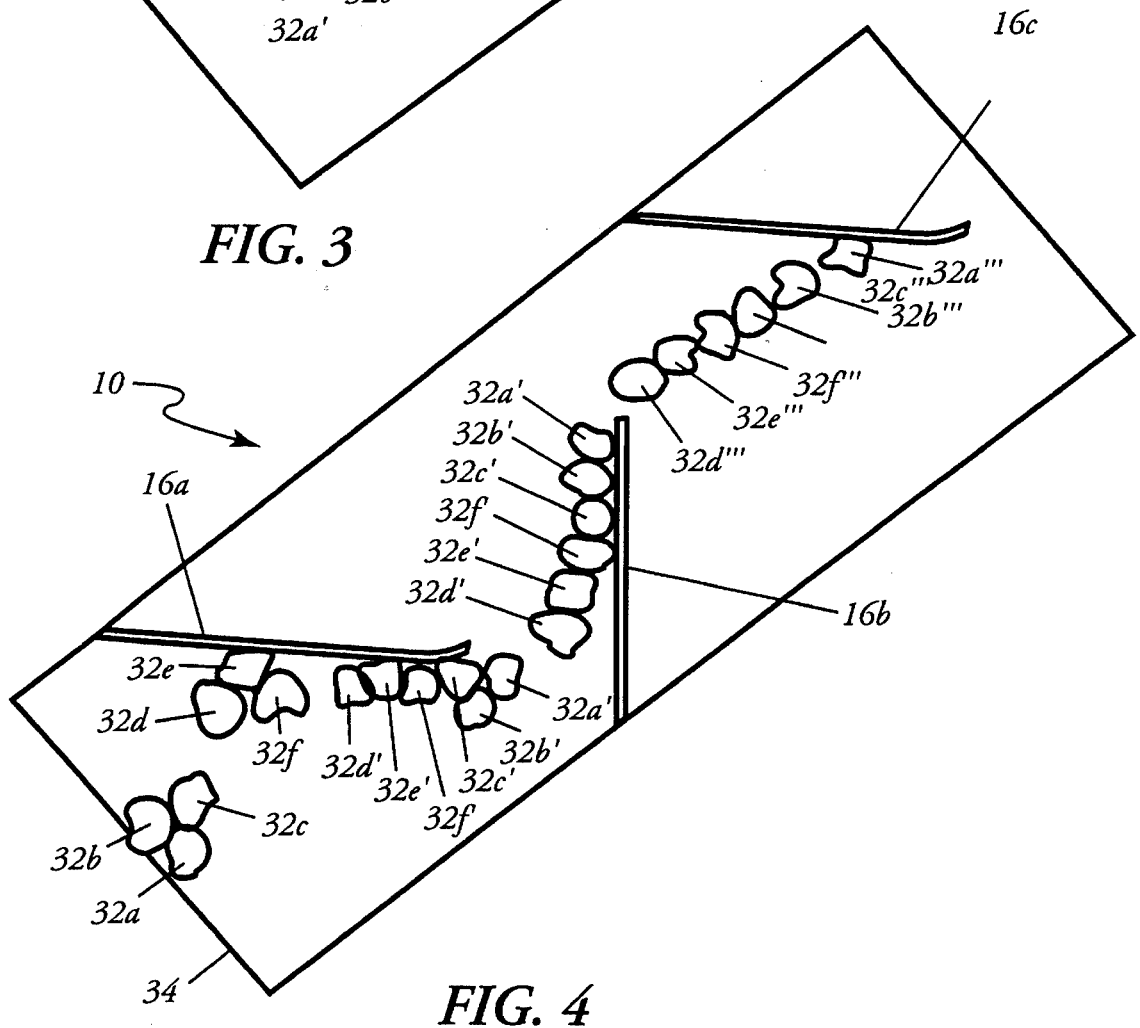
FIG. 4 is a top view of the diverter system of the present invention.

Referring now to FIG. 4, there is shown generally at 10 diverter system as it operates with more than two pieces of materials 32. As can be seen, materials 32a, 32b, 32c, 32d, 32e, and 32f may be clustered at receiving end 34, they are placed closer to single file after contact with first diverter 16a to assume positions 32a', 32b', 32c', 32d', 32e', and 32f'. Materials 32 become more singulated when contact with second diverter 16b is made thereby assuming positions 32a", 32b", 32c", 32d", 32e", and 32f". As materials 32 hit diverter end 42b, not only are materials 32 singulated but they are also separated slightly to assume positions 32a'", 32b'", 32c'", 32d'", 32e'", and 32f'" until they contact third diverter 16c.

As a result, applicant has found that closing large gaps between objects or clusters of objects is as important as the final goal of producing relatively small and uniform gaps between objects. The capacity of the system, that is the number of objects per second moving through the system, depends upon the number of objects which can be sensed and separated at any given time. Obviously, uniformity and presentation to the sensor and singulator increases this.

The length of gap between materials 32 may be further increased by the addition of acceleration conveyor 44. This feature is shown by referring to FIG. 5a which shows diverter system 10 and acceleration conveyor system 44. Materials 32 contact first diverter 16a followed by second diverter 16b and are generally uniform after contacting and passing beyond third diverter 16c. As stated above, conveyor belt 14 travels at velocity $V_b$ along path 26. Acceleration conveyor system has acceleration conveyor belt 46 which travels, in the preferred embodiment, at a velocity ($V_c$) of 135 percent of $V_b$ thereby allowing materials 32 to be separated farther. Therefore, as materials 32 pass beyond diverter ends 42, they will be traveling at $V_b$. However, as soon as they make contact with acceleration conveyor belt 46, they will be traveling at a new velocity of 1.35 times $V_b$. Therefore, when materials 32b contacts accelerator, it will be traveling at 1.35 times $V_b$ whereas materials 32c will only be traveling at $V_b$. The time element causes materials 32 to separate.

As shown in FIG. 5b, discharge end 36 is slightly above acceleration conveyor belt 46.

Prior to being placed on diverter conveyor 12, materials 32 must be fed to diverter system 10. Presently, some type of cleated conveyor system 50 of the type shown in FIGS. 6a and 6b is generally used in an attempt to provide a uniform feed of materials 32 from a hopper 48. Unfortunately, such system produces pulses at the end of conveyor 54 which are caused by materials being aligned along cleats so that the material held by one cleat will be deposited onto a conveyor whereas no other materials will be disposed on conveyor until the subsequent cleat arrives and to the correct position. These pulses then propagate throughout the rest of the materials handling system ultimately reducing the capacity of the system because there will be surges and valleys.

Referring now to FIG. 6a, cleated conveyor system 50 is shown having materials 32 being conveyed along cleats 52 on cleat conveyor 54. The preferred system has cross conveyor system 60 aligned substantially perpendicular to path of cleat conveyor system 50 such that pulses or waves 56 of materials 32 are provided along cross conveyor path 62. Materials placed on cross conveyor system 60 travel at cross conveyor velocity at a speed such that each pulse 56 is transported down cross conveyor path 62 so that subsequent pulse 56' can be deposited onto cross conveyor system 60 without interfering with prior pulse 56. Cross conveyor velocity is typically in the range of fifty to two hundred feet per minute. Its speeds can be calculated from the width of cleats 52 and the time between which pulses 56 are dumped by cleated conveyor system 50. If the speed of cleated conveyor system 50 is designated by $V_f$, the length between cleats 52 is designated by $L_C$, and the width of cleats 52 is designated by $W_C$, then the number of cleats per second is given by $V_f/L_C$ equal $C_S$ (cleats per second). If the width of each cleat is designated by $W_C$ then $C_S$ times $W_C$ equals $V_C$ which is the required cross conveyor velocity such that each length of objects dropped by cleat 52 or what we have called pulse 56 will fall in just behind the prior pulse.

In the preferred embodiment, slide 74 as shown in FIG. 6b is provided between incline cleat conveyor system 50 and cross conveyor system 60. This provides that pulses 56 will be deposited against far wall 64 of cross conveyor system 60. This will also assist in dislodging materials 32 placed on top of each other intend to orient materials 32 in a straight line.

The idea of the system shown in FIGS. 6a and 6b is the idea to provide feed to receiving end 34 of diverter system 10. There are no gaps between materials 32 as they leave cross conveyor system 60 and materials 32 are somewhat aligned along far wall 64 of cross conveyor system 60. In the preferred embodiment, cross conveyor path 62 is substantially perpendicular to cleat conveyor path 58.

The diverter system shown in FIGS. 1–5 close gaps between materials 32 because they affect the decrease in the average speed of materials 32 parallel to the motion of path 26.

In the preferred embodiment, when inhomogeneous materials are plastic bottles, conveyor belt 14 must be substantially eighteen inches (18") to thirty-six inches (36") wide to perform the required function without causing the bottles to jam between diverter 16 and sides 18, 20. When plastic bottles are singulated, diverter 16 must intersect path 26 at substantially one hundred thirty-five degrees (135°) to one hundred fifty degrees (150°). Diverter 16 should extend to a point substantially one-half to two-thirds of the width of conveyor belt 14. Conveyor belt speed should be between two hundred feet per minute and four hundred feet per minute.

In the preferred embodiment, diverter ends 42 are curved for a short section extending into conveyor belt 14 to facilitate the transition of materials 32 from a motion oblique to path 26 to one parallel path 26. In the preferred embodiment, diverter 16 should be spaced such that the area between subsequent diverter ends 42 should be at least as large as the perpendicular distance between diverter end 42 and side 18 or 20. There should be, in the preferred embodiment, a minimum of three diverters and as many as six diverters.

For objects other than plastic bottles, the width of the conveyor in the preferred embodiment should be at least as large as eight times the average width of largest material 32 with three to six diverters being used.

In the preferred embodiment, diverter 16 is mounted so that they float with spring return to maintain contact with conveyor belt 14. This is to prevent jamming due to sharp edges of materials 32 or due to other materials that may be present such as thin levels of grit from being wedged under diverter 16. The movement of conveyor belt lies past diverter 16 and is useful to bump diverter and free any clinging material. Additional means may be employed on belt such as a small cleat attached to conveyor belt in various places.

Figure 8:
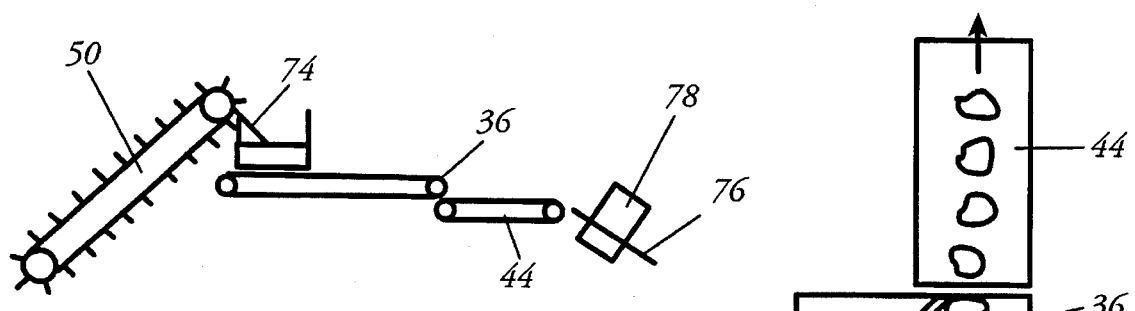
FIG. 8 is a side view of the system of the present invention.
Figure 7:
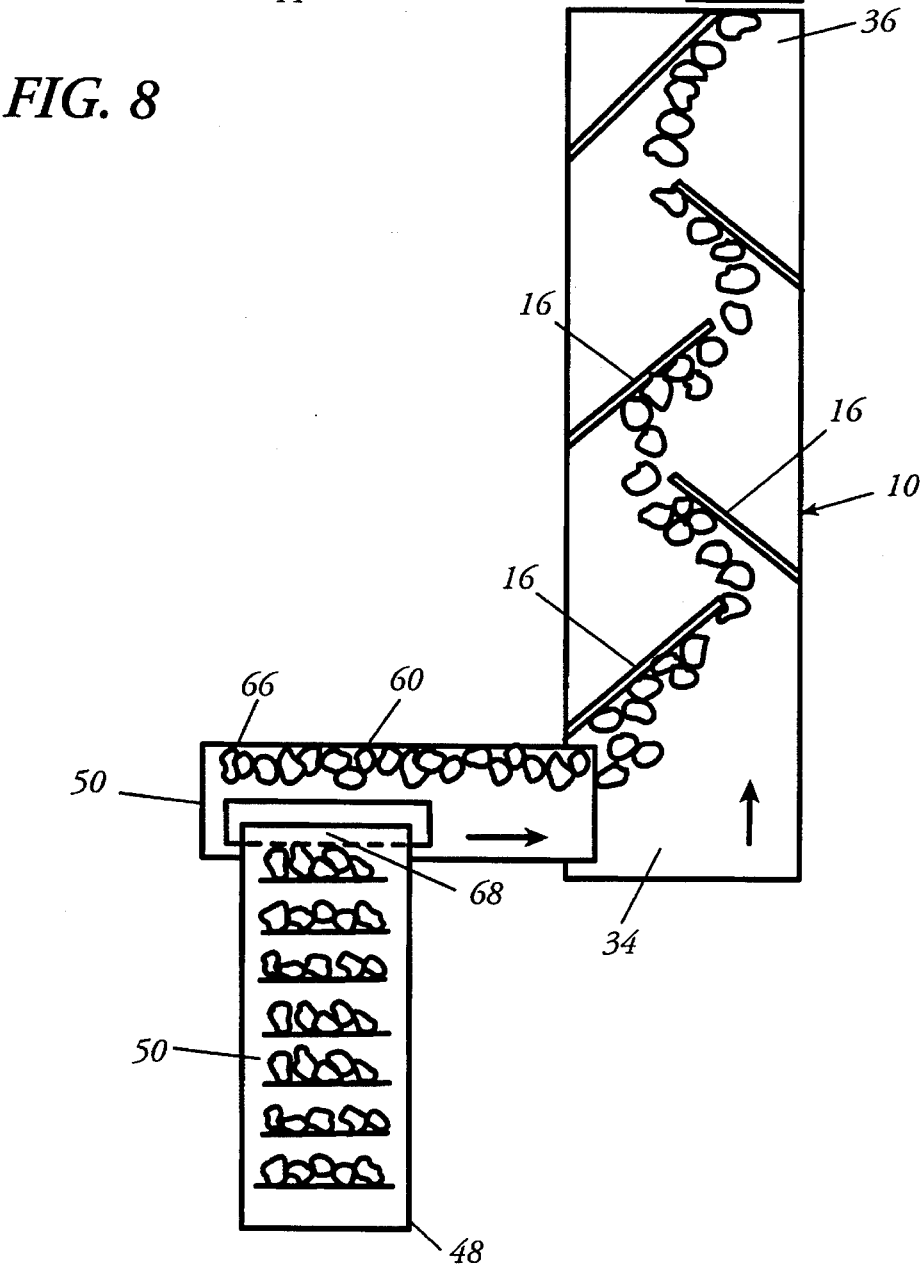
FIG. 7 is a plan view showing transport of materials from the cleat conveyor to the acceleration conveyor.
Figure 9A:
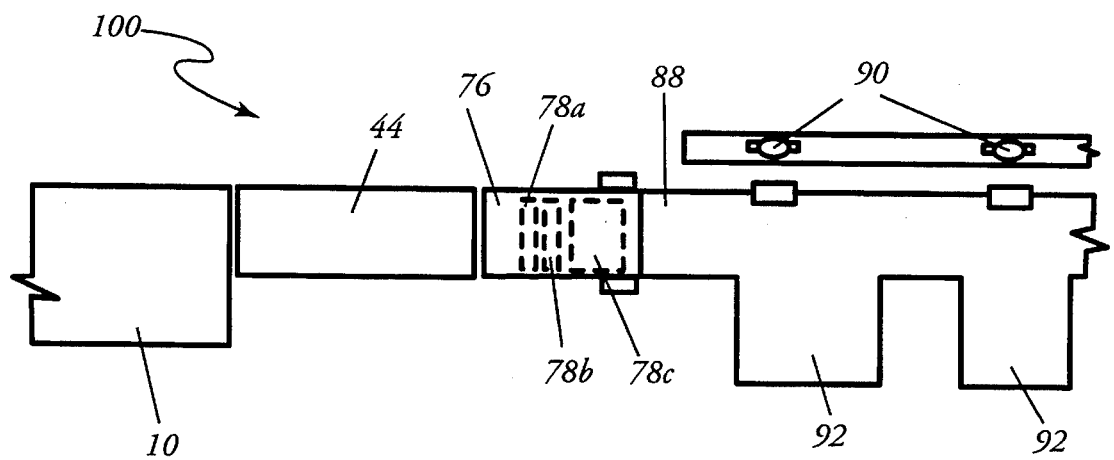
FIG. 9a is a plan view of the acceleration conveyor and sensing conveyor of the present invention.
Figure 9B:
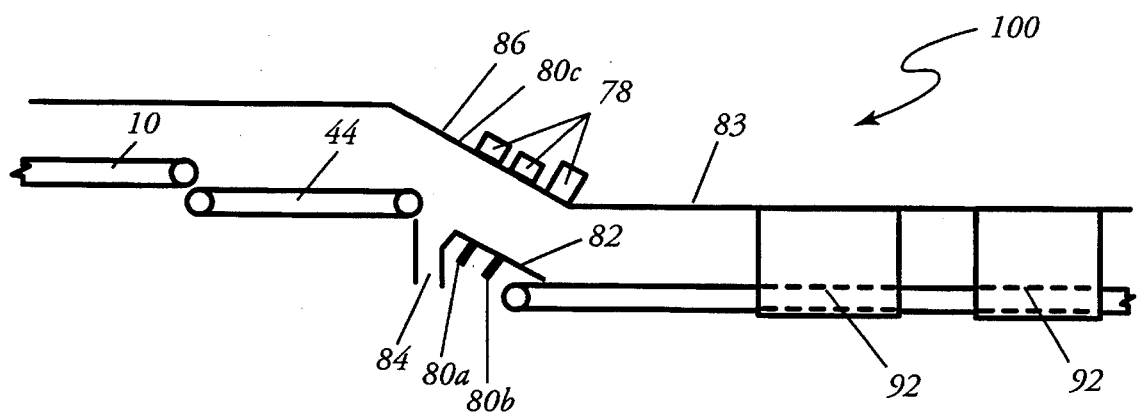
FIG. 9b is a side view of the acceleration conveyor and sensing conveyor of the present invention.

Referring now in combination between FIGS. 7, 8, and 9a, one can see the operation of system for singulating inhomogeneous materials 100 of the present invention. Materials are placed in bin 48 having opening 49 for expelling materials 32. Materials are then fed onto cleated conveyor system 50 which is, in the preferred embodiment, inclined. Proximate to output ends 68 of cleat conveyor system 50 there is placed slide 74 which delivers materials 32 to cross conveyor system 50 proximate to input end 66. Cross conveyor system 60 then transports materials 32 to receiving end 34 of diverter system 10. As materials 32 pass through diverter 16, singulation occurs. Materials then exit diverter system 10 at discharge end 36 onto acceleration conveyor system 44 which tends to space materials 32. Materials 32 are then fed onto sensor conveyor 76 in FIG. 8 or onto slide 86 through sensor 78. In the preferred embodiment, sensor 78 is actually plural sensors 78a, 78b, 78c projecting some type of energy to or through materials 32. Sensors 78a, 78b, 78c would have some type of corresponding receiver 80a, 80b to receive and analyze the energy transmitted through material 32. FIG. 9b specifically shows sensor slide 82 to which receivers 80a, 80b are attached. Just prior to slide 82 there is placed dirt chute 84 to prevent dirt from interfering with receivers 80a, 80b. If a reflector sensor is used, receiver 80c is placed on sensor platform 86. Information from receivers 80 is transmitted through a computer which classifies the type of material. As material 32 is fed onto separation conveyor 88, air nozzles 90 cooperating with receivers 80 eject material 32 into desired ejections chutes 92 for recycling.

The preferred angle of slide 82 is 15 to 25 degrees. The preferred gap for passing material 32 through sensors 78 is four inches. A wear cover is placed over receiver to reduce wear and tear.

Thus, although there have been described particular embodiments of the present invention of a new and useful system and method for singulating inhomogeneous materials, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A system for singulating pieces of material having different sizes and shapes comprising:
   a. means for transporting said pieces along a diverter path having a right side and a left side arid a receiving end and a discharge end;
   b. a first diverter extending across said diverter path from said right side intersecting said diverter path at an obtuse angle to said diverter path;
   c. a second diverter extending across said diverter path from said left side intersecting said diverter path at an obtuse angle to said diverter path such that first and second diverters do not overlap in a direction perpendicular to said diverter path; and
   d. an acceleration conveyor having an acceleration path receiving said material from said discharge end of said path wherein said velocity of said means for transporting said pieces along a path is less than the velocity of said acceleration conveyor.

2. The system of claim 1 wherein:
   a. said means for transporting said pieces along a path has a width and a middle point; and
   b. said first diverter and said second diverter extend across said middle point.

3. The system of claim 1 wherein said means for transporting said pieces along a path comprises a first conveyor belt.

4. The system of claim 1 further comprising:
   a. a right wall attached to said system proximate said right side; and
   b. a left wall attached to said system proximate said left side.

5. The system of claim 1 wherein said acceleration conveyor is aligned such that said acceleration path is approximately aligned with said path.

6. The system of claim 1 further comprising:
   a. a cross conveyor delivering said pieces to said receiving end, said cross conveyor having a cross conveyor velocity and an input end; and
   b. a cleat conveyor having an output end, said cleat conveyor for delivering said pieces to said input end of said cross conveyor, said cleat conveyor having a cleat conveyor velocity and plural cleats having a width.

7. The system of claim 6 wherein said cross conveyor velocity is between 50 to 200 feet per minute.

8. The system of claim 6 wherein said output end lies vertically above said input end.

9. The system of claim 5 further comprising:
   a. a sensor conveyor having a sensor path in line with said acceleration conveyor path for receiving said pieces from said acceleration conveyor, said sensor conveyor having a sensor conveyor path; and b. a sensor for reviewing said pieces passing along said sensor conveyor path.

10. The system of claim 9 further comprising a separation system communicating with said sensor to separate said material by type.

11. A method of separating inhomogeneous materials comprising the steps of:
   a. transporting said materials along a diverter path on a diverting system; and
   b. diverting said transported materials at angles obtuse to said diverter path
   c. depositing said materials on a cleated conveyor;
   d. delivering said materials from said cleated conveyor to a cross conveyor; and
   e. providing said materials from said cross conveyor to said diverter system.

12. The method of claim 11, wherein;
   a. said materials are inhomogeneous; and
   b. said step of diverting said materials being achieved by plural diverters arranged in sequence which do not overlap in a direction perpendicular to said diverter path.

13. The method of claim 11 further comprising the step of accelerating said diverted materials.

14. The method of claim 13 further comprising the step of sensing said accelerated materials.

15. The method of claim 14 further comprising the step of separating said sensed materials by type.

16. A system for singulating pieces of inhomogeneous material comprising:
   a. a bin for housing said pieces having an opening for expelling said pieces;
   b. a cleated conveyor having cleats for transporting said pieces along a cleated conveyor path, said cleated conveyor oriented below said opening to receive said pieces, said cleated conveyor having a cleated conveyor velocity;
   c. a slide attached to said cleated conveyor to receive said pieces as they travel off said cleated conveyor;
   d. a cross conveyor having a cross conveyor path oriented to receive said pieces from said slide and aligned such that said cross conveyor path is perpendicular to said cleated conveyor path, said cross conveyor having a cross conveyor velocity sufficient to receive all materials in a single file order;
   e. a diverter system for transporting said pieces along a diverter path having a right side and a left side and a receiving end and a discharge end, said diverter system having a first diverter extending across said diverter path from said right side intersecting said path at an obtuse angle to said diverter path, said diverter system having a second diverter extending across said diverter path from said left side intersecting said diverter path at an obtuse angle to said diverter path, said diverter system having a width and a middle point, said first diverter and said second diverter extend across said middle point, said diverter system having a diverter conveyor belt, a right wall attached to said system proximate said right side, a left wall attached to said system proximate said left side;
   f. an acceleration conveyor having an acceleration path receiving said material from said discharge end of said diverter path wherein said velocity of said diverter system is less than the velocity of said acceleration conveyor aligned such that said acceleration path is approximately aligned with said diverter path;
   g. a sensor conveyor having a sensor path in line with an acceleration conveyor path for receiving said pieces from said acceleration conveyor, said sensor conveyor having a sensor conveyor path; and
   h. a sensor attached proximate said sensor slide for reviewing said pieces passing along said sensor conveyor path; and
   i. a separation system communicating with said sensor to separate said material by type.

17. A system for singulating pieces of material comprising:
   a. said pieces of said materials having varying sizes and shapes;
   b. means for transporting said pieces along a diverter path having a right side and a left side and a receiving end and a discharge end;
   b. a first diverter extending across said diverter path from said right side intersecting said diverter path at an obtuse angle to said diverter path;
   c. a second diverter extending across said diverter path from said left side intersecting said diverter path at an obtuse angle to said diverter path such that first and second diverters do not overlap in a direction perpendicular to said diverter path; and
   d. an acceleration conveyor having an acceleration path receiving said material from said discharge end of said path wherein said velocity of said means for transporting said pieces along a path is less than the velocity of said acceleration conveyor.

* * * * *